3,217,073
**PROCESS FOR THE MANUFACTURE OF BIAXI-
ALLY ORIENTED POLYPROPYLENE FILM**
James R. Olson and Edmond S. Perry, Rochester, N.Y.,
assignors to Eastman Kodak Company, Rochester,
N.Y., a corporation of New Jersey
No Drawing. Filed Apr. 26, 1962, Ser. No. 190,247
3 Claims. (Cl. 264—178)

This invention relates to a process for the preparation of biaxially oriented polypropylene films of good optical clarity and with mechanical properties essentially equal in all directions in the plane of the film.

Polypropylene films have been made by conventional methods by extruding the melted polypropylene and drawing the melted extrusion to the desired film thickness after which it is cooled in a water bath or by contacting on chilled rolls. However, such films may show variations in Young's modulus of 2 to $6 \times 10^4$ kg./square cm. in tensile strength of 3,000–10,000 p.s.i. and tear strength 25–1000 grams, and show objectionable haze in 1-mil film. Moisture vapor transmission may be 0.6 gram per 100 square inches per 24 hours per mil.

It has been desired to produce a biaxially stretched polypropylene film which would have the superior characteristics of shelf life, durability, and the like, of polypropylene but which would still have the clarity, rigidity and biaxial characteristics found in regenerated cellulose film. It has been determined that the polypropylene sheet be extruded into a rapid quench medium after which the extruded sheet is subjected to a two-way stretch to develop the full potential of the inherent mechanical properties and optical clarity of polypropylene. The conditions under which these steps are performed determine the successful production of polypyropylene sheets having the desired balanced properties.

We have discovered a combination of properties which are unique in providing a biaxially stretched polypropylene film having superior clarity as well as modulus and tear strength.

One object of this invention is to provide a biaxially oriented polypropylene film. An additional object is to provide a polypropylene film having a high modulus and high clarity. A further object is to provide a method of biaxially orienting polypropylene to provide a new and superior product. The above objects are obtained by using conventional equipment available commercially.

The extrusion of the polymer is carried out in a definite temperature range of 190–230° C. In our preferred embodiment, the polypropylene is first heated to obtain a clear melt and then extruded through a suitable die to obtain a film of the desired thickness. The film may then be quenched by passing it into cold water or else onto a chilled cold roll so that the polymer is solidified and cooled during contact with the support to a temperature of at least 100° F. below its frost line temperature within at least 60 seconds from the time it leaves the extruder. The rate of cooling must be rapid enough to limit the formation of spherulites. In our preferred embodiment, 60° F. water is used to cool the roller upon which the melted polypropylene is extruded.

This operation is preferably accomplished by means of a pair of driven rolls which are located directly below the die lips. The rolls are partially immersed in a tank, the fluid of which is maintained at a specific low temperature. The rate at which the quenching can be carried out is dependent on the specific heat of the quenching fluid, the heat transfer coefficient at the fluid-polymer interface, the temperature differential through which the polymer is cooled, and the heat conductivity of the polymer. In our preferred embodiment the quenching is done with water maintained at 5–15° C.

Microscopic examinations of sections from sheets extruded under these conditions show that the spherulitic structure is extremely fine for the distance of at least 50 microns from the surface. Oriented films made from such sheets are optically clear. If the sheets are formed from melt extruded at higher temperatures, particularly 270–300° C., microscopic examination shows coarse spherulites throughout the entire thickness of the sheet. Oriented films from such sheets are hazy.

The stretching or biaxial orientation process is carried out in three distinct stages. The extruded sheet is first preheated, then tentered and finally drafted.

The preheat temperature is preferably maintained over a definite but narrow range. It has been found that a preheat temperature of about 155–160° C. gives the best results. The exact film temperatures in both the preheat and tenter ovens, however, is difficult to define because of the difficulty of measuring the actual temperature in the film as it passes through the oven. However, the film is kept in the ovens long enough to substantially raise its temperature to that of the ovens. Temperature measurements of the air are made with thermocouples strategically located to indicate the maximum and minimum air temperatures to which the film is exposed in passing through the ovens. Preheating the extruded sheet at higher temperatures produces haze in the final stretched sheet. The preheat temperature, of course, cannot exceed the melting point of the polymer for obvious reasons. Low temperatures induce cold drawing in tenter which is to be avoided.

The temperature of the tenter (widthwise stretch) zone is critical. It is maintained 15–20° C. below the temperature of the preheat and has an absolute value such that the sheet being tentered neither cold draws nor approaches the melting point of the polymer. If the temperature in this zone is too low, the sheet cold draws, and if too high, the maximum level of mechanical properties does not develop. By the combination of the preheat and tenter, the sheet is heated to a temperature while in the preheat so that subsequently the stretching begins at the higher temperature to prevent cold drawing at the start, and then stretching continues while the temperature continuously decreases to the level in which maximum mechanical properties are realized.

The level of mechanical properties developed in the final sheet is proportional to the degree of stretch applied in the two directions. For tenter (widthwise stretch) ratios up to 600 percent (7.0X) and for draft (lengthwise stretch) 500 percent (6.0X). Much lower ratios may be used for some purposes.

The temperature of the sheet at draft is not known precisely because of the difficulties in measurement. The draft occurs over a very narrow zone, and because of the extremely high rate at which it is applied, some additional heat is supplied from a radiant energy source in this zone. Some of this heat is consumed in stress relaxation so that a wrinkle-free film results.

The following examples are intended to illustrate our invention but not to limit it in any way.

EXAMPLE 1

A sample of Tenite polypropylene polymer manufactured by the Texas Eastman Company with an inherent viscosity of 1.64 was extruded from a melt temperature of 209° C. into a sheet 0.067" thick at the rate of 9.9 lbs./hr. The extrusion pressure was 935 p.s.i.g. The sheet was quenched by passing through rolls which were immersed in water at 10° C.

The sheet was stretched 600 percent widthwise and 400 percent lengthwise by first passing through the preheat oven in which a maximum air temperature of 161° C. to 154° C. minimum air temperature was measured. The tenter oven was operated so that the air temperature at the entrance was 143° C. and 133° C. at the exit.

|  | Lengthwise | Widthwise |
|---|---|---|
| Thickness (inches) | 0.0019 | 0.0019 |
| Young's modulus (kg./cm.$^2$×10$^4$) | 3.8 | 4.1 |
| Yield stress (kg./cm.$^2$) | 492 | 548 |
| Tensile strength (kg./cm.$^2$) | 2,070 | 2,220 |
| Elongation at break (percent) | 58 | 53 |
| Tear (g./mil) | 7 | 7 |

EXAMPLE 2

A sample of Tenite polypropylene polymer with an inherent viscosity of 1.75 was extruded from a melt held at 212° C. into a sheet 0.052" thick at the rate of 11.9 lbs./hr. The extrusion pressure was 825–850 p.s.i.g. The sheet was quenched by passing through rolls which were immersed in water at 10° C.

The sheet was stretched 470 percent widthwise and 290 percent lengthwise by first passing the extruded sheet through the preheat oven whose air temperature was measured to be at a minimum of 160° C. and at a maximum of 163° C. The tenter zone was maintained at an air temperature of 150° C. at the entrance and at 139° C. at the exit end.

The properties of the resulting film are tabulated:

|  | Lengthwise | Widthwise |
|---|---|---|
| Thickness (inches) | 0.0025 | 0.0025 |
| Young's modulus (kg./cm.$^2$×10$^4$) | 3.4 | 3.52 |
| Yield stress | 423 | 452 |
| Tensile strength (kg./cm.$^2$) | 1,450 | 1,760 |
| Elongation at break (percent) | 84 | 50 |
| Tear (g./mil) | 7 | 7 |

EXAMPLE 3

A sample of Profax polypropylene polymer, manufactured by the Hercules Powder Company, with an inherent viscosity of 1.75, was extruded from a melt at 207° into a sheet 0.057" thick at the rate of 10.7 lbs./hr. The extrusion pressure was 1025–1060 p.s.i.g. The sheet was quenched by passing through rolls which were immersed in water at 10° C. The density of the extruded sheet was 0.8982.

The sheet was stretched 600 percent widthwise and 470 percent lengthwise by first passing through the preheat zone at a minimum air temperature of 162° C. and a maximum of 168° C. The tenter oven was held at 151° C. at the entrance and 147° C. at the exit.

The properties of the resulting film are tubulated:

|  | Lengthwise | Widthwise |
|---|---|---|
| Thickness (inches) | 0.0012 | 0.0012 |
| Young's modulus (kg./mil×10$^4$) | 4.6 | 4.5 |
| Yield stress (kg./cm.$^2$) | 527 | 492 |
| Tensile strength (kg./cm.$^2$) | 2,050 | 1,510 |
| Elongation at break (percent) | 30 | 32 |
| Tear (g./mil) | 6 | 6 |

EXAMPLE 4

A sample of Profax polypropylene polymer with an inherent viscosity of 1.75 was extruded from a melt at 211° C. into a sheet 0.058" thick at the rate of 10.8 lbs./hr. The extrusion pressure was 1200 p.s.i.g. The sheet was quenched by passing through rolls which were immersed in water at 10° C.

The sheet was stretched 400 percent widthwise and 345 percent lengthwise by first passing through the preheat zone having a temperature range of 166–170° C. The tenter oven was held at 151° C. at the entrance and 149° C. at the exit.

The properties of the resulting film are tabulated:

|  | Lengthwise | Widthwise |
|---|---|---|
| Thickness (inches) | 0.0028 | 0.0028 |
| Young's modulus (kg./cm.$^2$×10$^4$) | 3.3 | 2.8 |
| Yield stress (kg./cm.$^2$) | 480 | 430 |
| Tensile strength (kg./cm.$^2$) | 1,900 | 1,460 |
| Elongation at break (%) | 76 | 76 |
| Tear (g./mil) | 10 | 10 |

A film having mechanical properties and optical clarity as indicated is obviously useful among other applications for a photographic product support and for a magnetic recording layer support. The properties reported for biaxially stretched polypropylene compare well with those of established photographic film supports such as cellulose triacetate and polystyrene. Typical values for the mechanical properties of these materials are present for comparison in Table I.

*Table I*

MECHANICAL PROPERTIES OF CELLULOSE TRIACETATE AND POLYSTYRENE FILMS

|  | Cellulose triacetate | | Polystyrene | |
|---|---|---|---|---|
|  | Length | Width | Length | Width |
| Thickness (inches) | 0.0056 | 0.0056 | 0.0052 | 0.0052 |
| Young's modulus (kg./cm.$^2$×10$^4$) | 3.9 | 3.4 | 3.3 | 3.4 |
| Yield stress (kg./cm.$^2$) | 820 | 650 | 790 | 790 |
| Tensile strength (kg./cm.$^2$) | 1,070 | 880 | 790 | 790 |
| Elongation at break (percent) | 28 | 46 | 3.1 | 3.1 |
| Tear (g./mil) | 8.4 | 11.0 | 4.4 | 4.2 |

If the polypropylene is extruded at a melt temperature so low that all of the polypropylene has not been completely melted, nuclei remain in the extruded sheet and the optical clarity is inferior. At low temperatures too, the extruded sheet is not smooth and glossy after quenching. In runs in which the melt temperatures were decreased to 183–6° C., the extruded sheets had rough surfaces which did not show the gloss apparent in higher temperature extrusions. Stretched films prepared from these extrusions showed internal haze values 0.2 to 0.5 percent higher than those from extrusions made at temperatures in our preferred range. The increase in total haze due to the poor surface was obvious on visual inspection.

Extrusions made at temperatures above those of our preferred range produce films of poor optical clarity. In addition, higher temperatures can be harmful to the polymer itself by degrading the molecules. Such degradation can be recognized by measurement of the intrinsic viscosity of the polymer before and after extrusion. If the sheets are formed from melt extruded at higher temperatures, particularly 270–300° C. and then oriented, microscopic examination shows coarse spherulites throughout the entire thickness of the sheet. Oriented films from such sheets are hazy.

It will be appreciated that the polypropylene which is operative in our invention is that which is substantially crystalline. In our preferred embodiment, the polypropylene is at least 95 percent crystalline, having a density of about 0.9 gram per cm. and a melting point of about 165–170° C. However, since the crystalline condition of polypropylene may be subject to considerable variation and depends upon the particular material used, a crystallinity of 65% can be used.

The invention has been describet in detail with particular reference to preferred embodiments thereof, but it will be understood that variations and modifications can be effected within the spirit and scope of the invention as described hereinabove and as defined in the appended claims.

We claim:
1. A process for producing biaxially oriented non-tubular, non-irradiated polypropylene film which comprises
    (1) extruding polypropylene at a melt temperature in a range of from 190° C. to 230° C. to provide a non-tubular film,
    (2) quenching the extruded film to a temperature of at least 56° C. below its frostline temperature within at least 60 seconds from the time it is extruded,
    (3) heating the quenched, extruded film at a specific temperature within the range of 145° C. to 175° C.,
    (4) stretching the film widthwise 6 to 8 times its original width while the film is gradually cooled to a temperature of 15° C. to 20° C. below the specific temperature within the range of 145° C. to 175° C., and immediately thereafter stretching the film lengthwise 4 to 6 times its original length.

2. A process for producing biaxially oriented non-tubular, non-irradiated polypropylene film which comprises
    (1) extruding polypropylene at a melt temperature in a range of from 190° C. to 230° C. to provide a non-tubular film,
    (2) quenching rapidly the extruded film in water maintained at a temperature of 5° C. to 15° C.,
    (3) heating the quenched, extruded film at a specific temperature within the range of 145° C. to 175° C.,
    (4) stretching the film up to 7 times its original width while the film is gradually cooled to a temperature of 15° C. to 20° C. below the specific temperature within the range of 145° C. to 175° C., and immediately thereafter stretching the film lengthwise 6 times its original length.

3. A process for producing biaxially oriented non-tubular, non-irradiated polypropylene film which comprises
    (1) extruding polypropylene at a melt temperature in a range of from 190° C. to 230° C. to provide a non-tubular film,
    (2) quenching rapidly the extruded film in water maintained at a temperature of 5° C. to 15° C.,
    (3) heating the quenched, extruded film at a specific temperature within the range of 155° C. to 160° C.,
    (4) stretching the film up to 7 times its original width while the film is gradually cooled to a temperature of 15° C. to 20° C. below the specific temperature within the range of 155° C. to 160° C., and immediately thereafter stretching the film lengthwise 6 times its original length.

References Cited by the Examiner

UNITED STATES PATENTS 3,022,543  2/62  Baird et al. _____ 18—48

FOREIGN PATENTS 236,955  1/62  Australia.
627,801  9/61  Canada.
849,436  9/60  Great Britain.
873,220  7/61  Great Britain.

ROBERT F. WHITE, *Primary Examiner.*
MORRIS LIEBMAN, *Examiner.*